Aug. 17, 1965    J. T. OSTGAARD    3,201,179
EMERGENCY DEVICE FOR PNEUMATICALLY OPERATED BRAKES
Filed May 13, 1963

INVENTOR.
JOHN T. OSTGAARD
BY *Elliott & Pastoriza*
ATTORNEYS

United States Patent Office 3,201,179
Patented Aug. 17, 1965

3,201,179
EMERGENCY DEVICE FOR PNEUMATICALLY OPERATED BRAKES
John T. Ostgaard, Los Angeles, Calif., assignor, by mesne assignments, to Royal Industries Inc., Pasadena, Calif., a corporation of California
Filed May 13, 1963, Ser. No. 280,018
4 Claims. (Cl. 303—71)

This invention relates generally to safety devices and more particularly, to a novel emergency device for enabling pneumatically operated brakes on a vehicle to be released in the event of loss of the normally supplied air pressure.

Pneumatically operated vehicle braking systems such as used in large trucks and/or trailers include a compressor for providing compressed air to operate the brakes. Usually, the brakes are set or locked by powerful mechanical means such as springs and air pressure is used to release the brakes against the bias of such springs. Thus, a fail-safe system is provided in the event the normal air pressure is lost.

Should a vehicle's brakes become locked as a consequence of loss of air pressure due to failure in the compressor system or leak in any of the air lines, the only recourse left to the driver in most instances is to release the brakes by a mechanical procedure. Once the brakes have been so released, they cannot be operated again unless the mechanical structure holding the brakes in released position is itself released. As a practical matter, the driver will release the brakes to only a partial extent so that some drag will result. With this arrangement, the truck may be driven to a repair station relatively safely. On the other hand, considerable time is consumed in both operating any emergency mechanical system and also in eventually transporting the truck to a repair site.

With the foregoing in mind, it is a primary object of this invention to provide a novel device designed to pneumatically release the vehicle brakes in the event of failure of normal air pressure supply thereto, so that the vehicle itself may be driven for a short distance in a normal manner.

More particularly, it is an object to provide an emergency brake release device for enabling pneumatically operated brakes to be released in the event of loss of normally supplied air, which is adapted to be mounted on the dashboard of the vehicle so as to be readily accessible and in which substantially no effort is required on the part of the driver to release the brakes.

Another important object is to provide an emergency device for pneumatically releasing vehicle brakes, which is compact, relatively inexpensive to manufacture, easy to install in conventional pneumatic brake systems, and which is extremely reliable in operation all to the end that considerable time and labor is saved in moving a truck to a repair site in the event of failure of the normal pneumatic system.

Briefly, these and other objects and advantages of this invention are attained by providing a body member incorporating suitable valve means and adapted to be mounted directly on the dashboard of a truck or other vehicle. The body member itself includes a normal inlet passage for receiving normally supplied air from the brake pneumatic system in the vehicle, an outlet passage for passing this air to the brakes, an exhaust passage for venting air from the brakes to set the brakes, and an emergency inlet passage for passing emergency air to operate the brakes in the event of a failure in the normally supplied air pressure. An emergency source of compressed air is also provided in the form of a cartridge adapted to be received in the emergency air inlet passage. The arrangement is such that the valve means in the body member is responsive to insertion of the cartridge to block off the normal air inlet passage and pass the emergency air directly to the outlet passage and thus to the brakes to release the brakes. Further means within the body structure are provided to enable exhaustion of the air from the outlet passage to set the brakes.

With the foregoing arrangement, in the event of failure of normally supplied air pressure, it is a simple matter for the driver to insert one of the compressed air emergency cartridges in the body member and thus provide emergency air to the brakes to release the same and permit normal driving to take place.

The emergency compressed air will be sufficient to release the brakes one time so that the driver may operate the truck and then exhaust the emergency air to set the brakes. In the event, however, that the operator has not been able to transport the truck to a repair site, it is possible for him to insert another cartridge, several of such cartridges being supplied so that maximum protection is provided under most normal circumstances.

A better understanding of the invention as well as various further features and advantages thereof will be had by now referring to a preferred embodiment thereof as illustrated in the accompanying drawings, in which.

Figure 1:
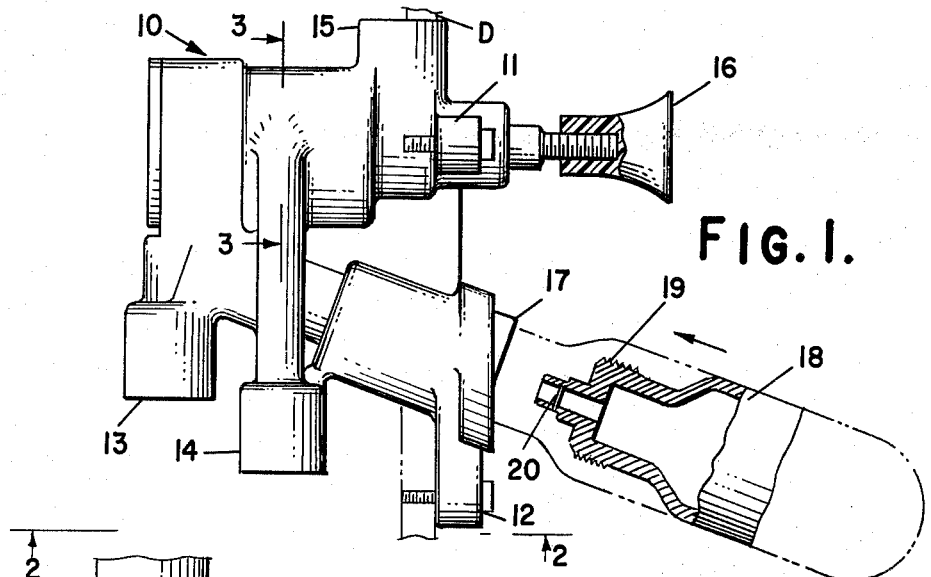
FIGURE 1 is an elevational view of the emergency brake setting device of this invention illustrating in fragmentary cut-away view an emergency cartridge.

Referring first to FIGURE 1, there is indicated by the dashed vertical lines a dashboard D of a vehicle such as a truck. A body member 10 is arranged to be mounted to the dashboard D as by suitable lugs, two of which are shown at 11 and 12. This body member includes a normal inlet passage 13 for receiving normally supplied air pressure from the vehicle's pneumatic braking system, an outlet passage 14 for passing the normally received air from the inlet passage to the braking system, and an exhaust passage 15 shown at the top portion of the body member 10 for exhausting air from the outlet passage 14 and thus from the braking system to enable setting of the brakes. This latter operation effected by a first valve means incorporated within the body 10 and operable between first and second positions by a pull knob 16.

As also shown in FIGURE 1, the body member 10 includes an emergency inlet passage 17 adapted to receive the neck portion of an emergency cartridge 18 containing the emergency air. Towards this end, there are provided external threads 19 on the neck of the cartridge adapted to mate with internal threads within the emergency inlet passage 17, so that the cartridge 18 may be threaded into the emergency inlet passage. The nose of the cartridge 18, as shown in the cross-section, includes a rupturable diaphragm 20 adapted to be broken automatically upon insertion of the cartridge 18 within the emergency inlet passage 17.

Figure 2:
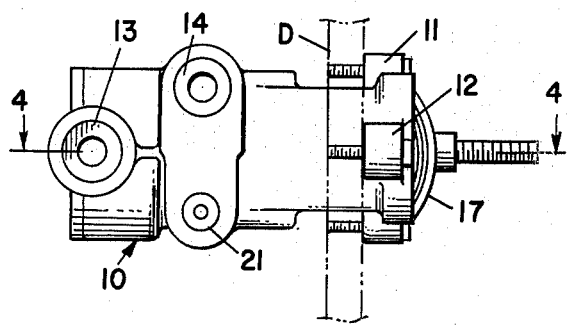
FIGURE 2 is a bottom plan view of the device of FIGURE 1.

The physical orientation of the various passages will be evident by referring to the bottom plan view of FIGURE 2 wherein it will be noted that the outlet passage 14 is offset from the inlet passage 13. Further, it will be noted that the body member 10 includes a relief port passage 21 offset on the opposite side of the body member from the outlet passage 14.

Figure 3:
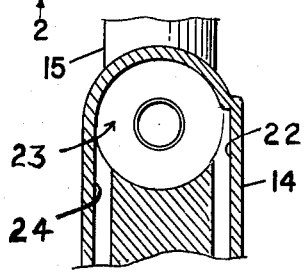
FIGURE 3 is a fragmentary cross-section taken in the direction of the arrows 3—3 of FIGURE 1.

The two passages from the outlet 14 and relief port 21 extend upwardly on opposite sides of the body member 10 and are in communication with each other as will be evident by reference to the fragmentary cross-section of FIGURE 3 wherein the outlet passage 14 extends, as indicated at 22 to a chamber 23 within the body member 10 and the relief port passage 21 extends upwardly as shown at 24 to also communicate with this chamber 23.

Figure 4:
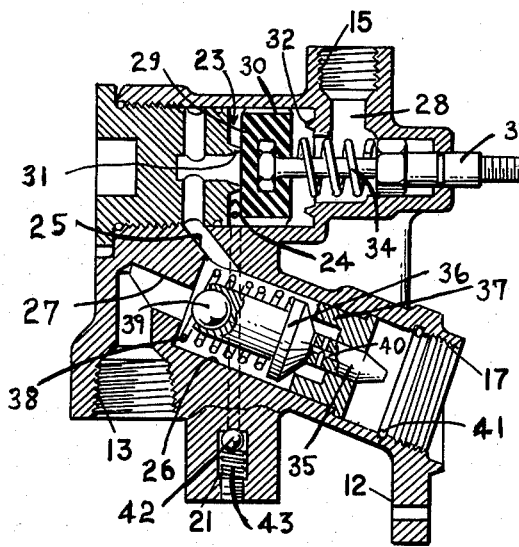
FIGURE 4 is a cross-section taken generally in the direction of the arrows 4—4 of FIGURE 2.

In FIGURE 4 only the inlet relief port passage 24 is visible as passing into the chamber 23 from the far side of the body member. As shown in FIGURE 4, there is provided an auxiliary passage 25 extending from a second chamber 26, this second chamber in turn communicating with the inlet passage 13 as by means of the passage 27. The exhaust passage 15, in turn, passes into an enlarged chamber portion 28 in the upper portion of the body member 10.

To control the flow of air between the inlet passage 13, the outlet passage 14 (FIGURE 1), and the exhaust passage 15, there is provided a first valve means including the chamber 23. As shown best in FIGURE 4, this first valve means includes a plunger 29 having peripheral channels 30 so that portions of the chamber 23 on either side of the plunger are in communication. Opposite sides of the plunger, in turn, are adapted to close off openings 31 and 32 defined by valve seats on opposite ends of the chamber 23. The inlet opening 31 is in communication with the auxiliary passage 25 and second chamber 26, and through the passage 27, with the inlet passage 13. The outlet opening 32 communicates through chamber 28 with the exhaust passage 15.

The plunger 29 is arranged to be moved between first and second positions as by means of a plunger stem 33 connected to the pull knob 16 described in FIGURE 1. A spring 34 normally biases the plunger 29 to its first position in which the inlet opening 31 is sealed closed.

Referring now to the lower portion of FIGURE 4, the second chamber 26 constitutes part of a second valve means including a valve stem 35 carrying a valve head 36. This valve head 36 normally seats against a valve seat 37 to close off the entrance of the emergency inlet passage 17. This position of the valve head 36 is maintained by a compression spring 38 in the chamber 26. The opposite end portion of the valve head 36 in turn includes a ball 39 adapted to close off the inlet passage 27 to the chamber 26 when the valve head and stem are moved against the pressure of the spring 38. The end of the valve stem 35 facing the emergency inlet passage at 17 is tapered to form a piercing structure, this piercing structure including an internal passage 40. The entrance portion of the emergency inlet passage 17 includes an O-ring 41 for cooperation with the neck portion of the cartridge 18 illustrated in FIGURE 1.

In FIGURE 4, the relief port 21 described in FIGURE 2 is illustrated partially in cross-section wherein there is provided a simple check valve ball 42 and spring 43 which may be set to pre-load the ball and thus hold this relief port closed until a predetermined pressure is exceeded. As stated, this relief port is in communication through the chamber 23 with the outlet passage 14 so that pressure in excess of a predetermined value cannot be applied to the braking system.

With the foregoing description of the various components of the emergency brake releasing device in mind, its operation will now be described.

With particular reference to FIGURE 4, under normal conditions the various components will be in the positions illustrated. Thus, the plunger 29 will be in its first position sealing the inlet opening 31. Under these circumstances, the outlet passage 14 will be in communication with the exhaust passage 15 through the chamber 23, channels 30, opening 32 and chamber 28, and thus the brakes of the vehicle will be set by any suitable mechanical biasing means such as powerful springs. Further, the second valve head 36 will be seated against the valve seat 37 thereby closing off the emergency inlet passage 17 and placing the normal air supply inlet passage 13 in communication with the auxiliary passage 25. Since the inlet opening 31 is sealed by the plunger 29, this inlet air pressure will be blocked from the outlet passage 14 in the chamber 23.

When it is desired to drive the vehicle, the brakes are released by simply pulling on the pull knob 16 to move the stem 33 shown in FIGURE 4 to the right and thus seat the plunger 29 against the outlet opening 32. In this latter second position of the plunger 29, the outlet opening to the exhaust passage 15 will be sealed and simultaneously, the inlet opening 31 will be uncovered to permit normal air pressure received in the inlet passage 13 to pass into the chamber 23 and thence out the outlet passage to the brakes, thereby releasing the brakes. The inlet air pressure will hold the plunger 29 against the outlet opening 32 and force the spring 34. The truck may then be driven in a normal manner. When it is desired to set the brakes, the driver need only push inwardly on the knob 16 to reseat the plunger 29 on the inlet opening 31 and uncover the outlet opening 32 thereby exhausting air from the outlet passage and brakes to the exhaust passage 15.

If now a failure should occur in the normally supplied air so that air pressure is lost, the brakes will automatically be set in locked position as a consequence of the fail-safe features of normal pneumatic braking systems. This action will take place before all of the normally supplied air is exhausted since the plunger 29 is held against the exhaust outlet opening 32 by the normally supplied air pressure acting on the lefthand side of the plunger 29. Thus, as this air pressure drops below a safe level, the spring 34 will urge the plunger 29 to the left to seal the inlet opening and open the exhaust so that the air within the brake system will be released and the brakes will be set.

When the foregoing occurs, in order to release the brakes and enable the truck to be driven to a repair site, the driver need only insert one of the cartridges such as the cartridge 18 illustrated in FIGURE 1 in the emergency inlet passage 17. This insertion is effected by threading the external threads 19 to the internal threads within the emergency inlet passage 17, the threading movement urging the rupturable diaphragm 20 against the piercing end of the stem 35. The initial threading movement will urge the stem and valve head 36 to the left as viewed in FIGURE 4 to unseat from the valve seat 37 and thus place the chamber 26 in communication with the emergency inlet passage 17. Also, this movement will seat the ball 39 against the inlet of the passage 27 to the chamber 26 and thus block or close off the normal inlet passage 13.

Further threading of the cartridge will result in the stem 35 piercing the diaphragm 20 and thus releasing the emergency air within the cartridge. This air will pass through the internal passage 40 of the stem 35 and thence past the head 36 which is now clear of the seat 37. The emergency air then passes through the auxiliary passage 25 to the inlet opening 31. The air pressure will thus act against the left side of the plunger 29. The driver will then pull on the knob 16 to move this plunger to the right thereby seating the same against the outlet opening 32 and thus blocking off the exhaust passage 15 from the chamber 23. The initial movement of the plunger 29 to the right serves to admit the emergency air pressure into the chamber 23 and this air pressure then acts on the plunger 29 to seat it against the outlet opening 32. The compressed air within the chamber 23 will then pass through the normal outlet passage extension 22 illustrated in FIGURE 3 and outlet passage 14 to the braking system to release the brakes.

The driver may now drive in a normal manner and when it is desired to reset the brakes, he need only push the knob 16 to seat the plunger 29 against the inlet opening 31 and unseat the outlet opening 32 to permit air within the chamber 23 and thus in the braking system to be exhausted out the outlet passage 15. This exhaustion of the air will then set the brakes in locked position.

If the driver has not as yet reached an emergency repair site, he may, if necessary, inset another cartridge of compressed air to release the brakes and enable further driving to take place.

Since the device is mounted directly on the dashboard of the vehicle, the entire foregoing operation may be carried out relatively quickly and with a minimum of effort. Thus, it is not necessary for the driver to climb out of the cab of the truck and effect various operations on the braking system itself.

The entire system is protected by the relief port 21 which is arranged to exhaust air from the chamber 23 should it exceed a predetermined pressure when the plunger 29 is in its second position sealing the exhaust passage 15.

From the foregoing description, it will be evident that the present invention has provided an extremely useful emergency device adaptable to any pneumatically operated braking system.

While reference has been made to an air pressure system, it is obvious to those skilled in the art that any suitable gas may be employed either for the entire system or in the cartridge 18 itself. Thus, the term "air" as used herein is meant to define any type of gas such as carbon dioxide or other fluid medium which may be delivered under pressure.

Other changes that fall clearly within the scope and spirit of this invention will occur to those skilled in the art. The emergency brake releasing device is therefore not to be thought of as limited to the one embodiment set forth merely for illustrative purposes.

What is claimed is:

1. In a pneumatic braking system for a vehicle in which air pressure is used to hold the vehicle brakes in released position against the force of mechanical springs, an emergency brake releasing control device for enabling said brakes to be released in the event of loss of the normally supplied air pressure, comprising, in combination: a body member adapted to be secured to the dashboard of said vehicle including: a normal inlet passage for receiving normally supplied air pressure, an outlet passage for passing air received in said normal inlet passage to said brakes, an air exhaust passage, and an emergency air pressure inlet passage; first valve means in said body member adapted to close off said normal inlet passage from said outlet passage and place said exhaust passage in communication with said outlet passage when in a first position, and to place said inlet passage in communication with said outlet passage and close off said outlet passage from said exhaust passage when in a second position; a cartridge containing emergency air under pressure adapted to be inserted in said emergency air pressure inlet passage; and second valve means responsive to insertion of said cartridge to close off communication between said normal inlet passage and outlet passage and permit the air in said cartridge to be in communication with said outlet passage when said first valve means is moved to said second position.

2. An emergency brake releasing control device according to claim 1, in which said first valve means includes an internal valve chamber having opposite valve seats respectively defining an inlet opening in communication with said normal inlet passage in the absence of said cartridge being received in said emergency inlet passage; and an outlet opening in communication with said exhaust passage; a plunger in said chamber having one face juxtaposed said inlet opening and an opposite face juxtaposed said outlet opening, said plunger including peripheral channels so that chamber portions on opposite sides of said plunger are in communication, said plunger being movable back and forth to close off said inlet opening when in a first position and said outlet opening when in a second position; a spring means urging said plunger to its first position, said outlet passage communicating with said valve chamber between said valve seats, whereby movement of said plunger to said second position, seals said outlet opening and admits air through said inlet opening from said inlet passage to pass into said valve chamber and out said outlet passage, and movement of said plunger to said first position seals said inlet opening and permits air to pass from said outlet passage through said valve chamber and out said outlet opening to said exhaust passage.

3. An emergency brake releasing control device according to claim 2, in which said second valve means includes a valve chamber in said body communicating with said normal inlet passage and said emergency inlet passage; an auxiliary passage from said valve chamber passing to said inlet opening in said first valve means; a valve stem having a piercing end mounted in said chamber facing said emergency inlet passage, said cartridge including a diaphragm sealing said emergency air therein and positioned to be pierced by said valve stem when inserted in said emergency inlet opening to pass air into said valve chamber; and a valve head mounted on said valve stem for closing off said emergency inlet opening when in a first position and movable with said stem upon insertion of said cartridge to open said emergency inlet passage and close off said normal inlet passage whereby said emergency air passes through said auxiliary passage to said inlet opening in said first valve means to thence pass to said outlet passage when said plunger in said first valve means is moved to said second position.

4. An emergency brake releasing control device according to claim 3, including a relief valve in said body communicating with said valve chamber in said first valve means for exhausting air under a pressure in excess of a given air pressure.

References Cited by the Examiner
UNITED STATES PATENTS

| | | | |
|---|---|---|---|
| 2,814,363 | 11/57 | Phillips | 188—151 |
| 2,977,156 | 3/61 | Di Gioia | 303—2 |
| 3,110,523 | 11/63 | Johnson | 303—1 |

EUGENE G. BOLTZ, *Primary Examiner.*